United States Patent [19]

Wiltermood et al.

[11] Patent Number: 4,521,968
[45] Date of Patent: Jun. 11, 1985

[54] MAPPING SYSTEM FOR AN INTERNAL CYLINDRICAL SURFACE

[75] Inventors: Larry C. Wiltermood, Port Orchard, Wash.; David J. Barich; Fred G. Siedow, both of San Jose, Calif.

[73] Assignee: Westinghouse Electric Corp., Pittsburgh, Pa.

[21] Appl. No.: 434,098

[22] Filed: Oct. 12, 1982

[51] Int. Cl.³ .......................... G01B 7/12; G01B 7/28
[52] U.S. Cl. .................................. 33/178 E; 33/286; 33/DIG. 21
[58] Field of Search ............ 33/174 Q, 174 M, 178 E, 33/178 F, 286, DIG. 21

[56] References Cited

U.S. PATENT DOCUMENTS

| | | | |
|---|---|---|---|
| 3,631,601 | 1/1972 | McNulty | 33/286 |
| 3,939,570 | 2/1976 | Loftus | 33/178 F |
| 4,021,925 | 5/1977 | Loftus | 33/178 F |
| 4,155,648 | 5/1979 | Ferguson | 33/286 |

FOREIGN PATENT DOCUMENTS 3003415  8/1981  Fed. Rep. of Germany .... 33/178 E

Primary Examiner—Richard R. Stearns
Attorney, Agent, or Firm—F. J. Baehr, Jr.

[57] ABSTRACT

Apparatus for mapping the inner surface of a cylinder utilizing a laser to align a spider disposed within the cylindrical surface, the spider having a rotatable arm with a finger connected to a linear variable differential transducer. The finger being biased outwardly and the arm is rotated 360° from a predetermined angular position, the spider and arm are moved axially predetermined increments and signals indicative of the axial and annular position of the arm and the extension of the finger are recorded and processed to map the internal surface of the cylinder.

3 Claims, 1 Drawing Figure

U.S. Patent   Jun. 11, 1985   4,521,968
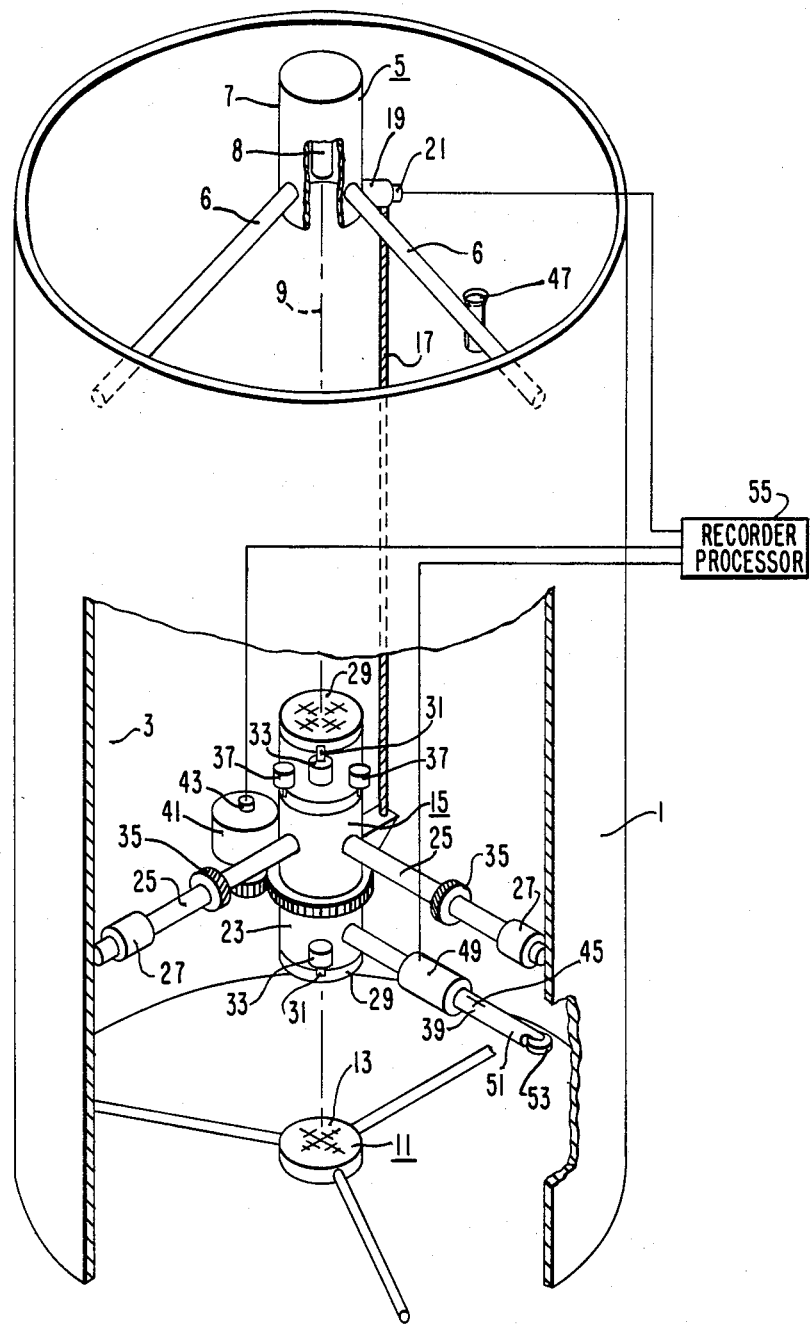

MAPPING SYSTEM FOR AN INTERNAL CYLINDRICAL SURFACE

GOVERNMENT CONTRACT

The Government has rights in this invention pursuant to Contract No. F04704-78-C-0016 between Martin Marietta and the Department of Defense and Subcontract RHO-110203 with Westinghouse Electric Corporation.

BACKGROUND OF THE INVENTION

This invention relates to a system for checking the dimensions of a cylindrical surface and more particularly for checking and recording the internal dimensions of a cylindrical surface. Tolerances set for launch tubes are very close and there is difficulty determining whether or not these tolerances have been met in a completed tube. Therefore, apparatus for rapidly mapping the internal surface of a launch tube is needed.

SUMMARY OF THE INVENTION

In general, a system for mapping an internal cylindrical surface, when made in accordance with this invention, comprises a first spider disposed adjacent one end of the cylindrical surface, a second spider disposed adjacent the other end of the cylindrical surface and a third spider disposed in the cylindrical surface intermediate the ends. The first spider has a laser disposed therein, the laser projects a beam of light generally normal thereto and generally coincident with the axis of the cylinder. The second spider has a target centrally disposed thereon to check the alignment of the laser beam with the axis of the cylindrical surface. The third spider has a pair of targets; one target disposed on each end of a central bore. The targets can be flipped out of the way to pass the laser beam to the lower target on the third spider to the target on the second spider. The targets on the third spider allow it to be aligned with the axis of the cylinder. The third spider also has a rotatable arm with a linear variable differential transducer disposed on the distal end. The arm also has a target disposed thereon so that its angular position can be preset with respect to the first spider. The arm is rotated 360° from the preset position and a signal is sent indicating its angular position as well as signal from the linear variable differential transducer indicating the radius of the cylinder. The axial position of the arm is also recorded, and the third spider is moved axially in predetermined increments. The recorded information is processed to determine the average diameter, concentricity, roundness and bow of the cylindrical surface which can be compared with predetermined tolerances.

BRIEF DESCRIPTION OF THE DRAWINGS

The objects and advantages of this invention will become more apparent from reading the following detailed description in conjunction with the sole drawing in which:

The sole FIGURE is an isometric view of a cylinder schematically showing a system for mapping the inner surface thereof.

DESCRIPTION OF THE PREFERRED EMBODIMENT

Referring now to the sole FIGURE in detail there is shown a cylinder 1 having a generally cylindrical inner surface 3 which is to be mapped. Disposed adjacent one end of the cylinder 1, the top end as shown in the drawing, is a first spider 5 or support which spans the cylindrical opening. The first spider 5 has three legs 6 which support a centrally disposed housing 7 in which a laser 8 is placed. The laser 8 produces a beam of light 9 which can be aligned with the central axis of the cylindrical surface 3.

A second spider 11 or support which spans the cylindrical opening is disposed adjacent the other end of the cylindrical opening, the bottom end as shown in the drawing, and has a target 13 centrally disposed thereon to assist in aligning the beam of light 9 from the laser 8 with the axis of the cylindrical surface 3.

A third spider 15 or support, which spans the cylindrical opening, is disposed within the cylindrical opening intermediate the ends. The third spider 15 is connected to a cable 17 depending from a hoist 19 or other means for raising or lowering the third spider within the cylindrical opening and has means 21 disposed thereon for producing a signal indicative of the distance between the one end or top of the cylindrical opening and the third spider 15.

The third spider 15 has a centrally disposed housing 23 and three legs 25 (only two of which are shown) which extend outwardly therefrom to contact the inner cylindrical surface. The legs 25 have pneumatic cylinders 27 or other means disposed adjacent their outer ends to affix the third spider 15 at one elevation or position within the cylindrical surface. The housing 23 has a centrally disposed bore or opening and a target 29 upon which the laser beam 9 can be directed centrally disposed on each end thereof. The targets 29 having hinges 31 and a pneumatic cylinder 33 or other means for flipping or moving each of the targets individually out of the path of the laser beam 9 so that the beam can be directed to the lower target 29 or to the target 13 on the second spider 11.

The central bore and targets 29 have means cooperatively associated therewith for moving them in the X-Y direction in a plane, such means are indicated at 35 and include servo motors and screws which move the central bore and targets 29 in the X-Y directions in a plane.

The azimuth of the central bore and targets 29 is also adjustable by means of servo motors or other drive means 37, which are operated to align the azimuth of central bore and targets 29 with the laser beam 9.

Also disposed on the housing 23 is a rotatable arm 39 disposed to rotate about the axis of the central bore and targets 29. A servo motor or other drive means 41 rotates the arm 39 and has means 43 disposed thereon for producing a signal indicative of the angular position of the arm 39 as it rotates. The arm 39 also has a target 45 disposed thereon. The target 45 is utilized in conjunction with the first spider which sends out a light beam deflected from the laser utilizing mirrors (not shown) or has a telescope 47 with cross hairs disposed therein to align the angular position of the arm 39 with a fixed position relative to the first spider 5 and the cylindrical surface 3 to insure a fixed starting point at each axial position of the third spider 15.

The arm 39 also has a linear variable differential transducer 49 disposed on its distal end. The transducer 49 has a finger 51 with a roller 53 on the end. The finger 51 is biased outwardly so that the roller contacts the inner surface 3 of the cylinder 1. The arm 39 is of known length and the linear variable differential transducer 49 produces a signal indicative of the distance between the axis of the bore of the housing and the cylindrical surface 3 as the arm 39 rotates 360°.

The signals indicative of the distance from the top of the cylindrical surface, the distance from the axis of the bore of the housing 23 to the cylindrical surface and the angular position of the arm 39 are recorded and processed in a recorder processor 55 to indicate the average radius of the cylinder and deviations therefrom and the distance from one end of the cylinder.

The third spider is raised or lowered in predetermined increments and fixed at each elevation and the arm 39 is rotated to its set angular position with respect to the first spider and then rotated 360° at each incremental position along the axis of the cylindrical surface. The recorder processor receives and processes the signals to produce information such as the bow, roundness, average diameter, and concentricity of the inner cylindrical surface, which information can be compared with predetermined tolerances producing an accurate quality check of an inner cylindrical surface in a relatively short time.

What is claimed is:

1. A system for mapping an internal cylindrical surface comprising:
    a first spider disposed adjacent one end of said cylindrical surface;
    a second spider disposed adjacent the other end of said cylindrical surface;
    a third spider disposed within said cylindrical surface intermediate said ends;
    said first spider having a laser disposed therein which projects a beam of light generally normal thereto and from its center;
    said second spider having a target centrally disposed thereon and so disposed within the cylindrical surface that when said beam of light strikes the center of said target said beam of light is generally aligned with the axis of said cylindrical surface;
    means for positioning said third spider within said cylinder and producing a signal indicative of the depth therein of said third spider relative to said one end of said cylinder;
    means for affixing said third spider at any depth relative to said one end of said cylinder;
    said third spider having a centrally disposed opening extending therethrough, a first target disposed at one end of said opening and a second target disposed at the other end of said opening;
    means for moving said first and second targets from the axis of said opening in said third spider to a position where said opening will pass said beam of light unobstructed therethrough;
    an arm rotatably disposed on said third spider to rotate about the axis of said opening in said third spider;
    means for adjusting the azimuth and X-Y position of said central opening within said third spider after said third spider has been affixed at one position within said cylinder so that said axis of said central opening can be aligned with said axis of said cylindrical surface utilizing said beam of light and said first and second targets disposed at the ends of said opening;
    means for determining a set angular position of said rotatable arm with respect to a fixed point on said cylindrical surface;
    means for rotating said arm and producing a signal of said arms angular position with respect to said set angular position;
    said arm having a predetermined length, having a movable end which is biased outwardly and having means for producing a signal indicative of the distance between the axis of said arm and the distal end of said movable end thereof; and
    means for recording signals indicative of the depth of said third spider with respect to said one end of the cylindrical surface, said angular position of said arm with respect to said set angular position and the distance between the axis of said rotatable arm and said distal end thereof.

2. A system as set forth in claim 1 and further comprising:
    means for recording the signals indicative of the depth of the third spider with respect to one end of the cylindrical surface, the angular position of the arm with respect to its set angular position and the distance between the axis of the rotating arm and the distance to the distal end thereof when the third spider is disposed at a plurality of axial positions with respect to the cylindrical surface.

3. A system as set forth in claim 2 and further comprising means for processing the signals recorded to determine the average radius, concentricity and bow of the cylindrical surface.

* * * * *